(12) United States Patent  
Kojima

(10) Patent No.: US 7,539,808 B2  
(45) Date of Patent: May 26, 2009

(54) INFORMATION PROCESSING APPARATUS, INFORMATION PROCESSING SYSTEM, AND PROGRAM

(75) Inventor: Hiroshi Kojima, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 128 days.

(21) Appl. No.: 11/411,052

(22) Filed: Apr. 26, 2006

(65) Prior Publication Data

US 2006/0248257 A1 Nov. 2, 2006

(30) Foreign Application Priority Data

Apr. 27, 2005 (JP) ............... 2005-129625

(51) Int. Cl.
H05K 7/10 (2006.01)
(52) U.S. Cl. ...................... 710/302; 713/324
(58) Field of Classification Search ......... 713/300–340; 710/301–304
See application file for complete search history.

(56) References Cited

U.S. PATENT DOCUMENTS

| | | | | |
|---|---|---|---|---|
| 5,386,567 A | * | 1/1995 | Lien et al. ............... | 713/100 |
| 5,473,499 A | * | 12/1995 | Weir ....................... | 361/58 |
| 5,943,482 A | * | 8/1999 | Culley et al. ............ | 710/302 |
| 6,138,194 A | * | 10/2000 | Klein et al. .............. | 710/302 |
| 6,170,062 B1 | * | 1/2001 | Henrie .................... | 713/340 |
| 6,434,703 B1 | * | 8/2002 | Parrish et al. ........... | 713/310 |
| 7,082,488 B2 | * | 7/2006 | Larson et al. ........... | 710/301 |

FOREIGN PATENT DOCUMENTS

| | | |
|---|---|---|
| JP | 2001-133499 A | 5/2001 |
| JP | 2001-147747 A | 5/2001 |
| JP | 2001-228944 A | 8/2001 |
| JP | 2003-140784 A | 5/2003 |
| JP | 2003-518892 A | 6/2003 |

\* cited by examiner

*Primary Examiner*—Paul R Myers  
(74) *Attorney, Agent, or Firm*—Sughrue Mion, PLLC

(57) ABSTRACT

An information processing apparatus includes a port that connects a peripheral apparatus to the information processing apparatus through a USB, a first switch that interrupts supply of a power to the peripheral apparatus through the port under an OS control, a second switch that interrupts the supply of the power to the peripheral apparatus when the first switch operates to supply the power thereto, and a control unit that monitors whether a failure occurs to a connection between the information processing apparatus and the peripheral apparatus through the port and that controls an operation of the second switch based on a monitoring result independently of the OS control. The control unit switches the second switch so as to reset the connection when detecting that the failure occurs to the connection.

12 Claims, 9 Drawing Sheets

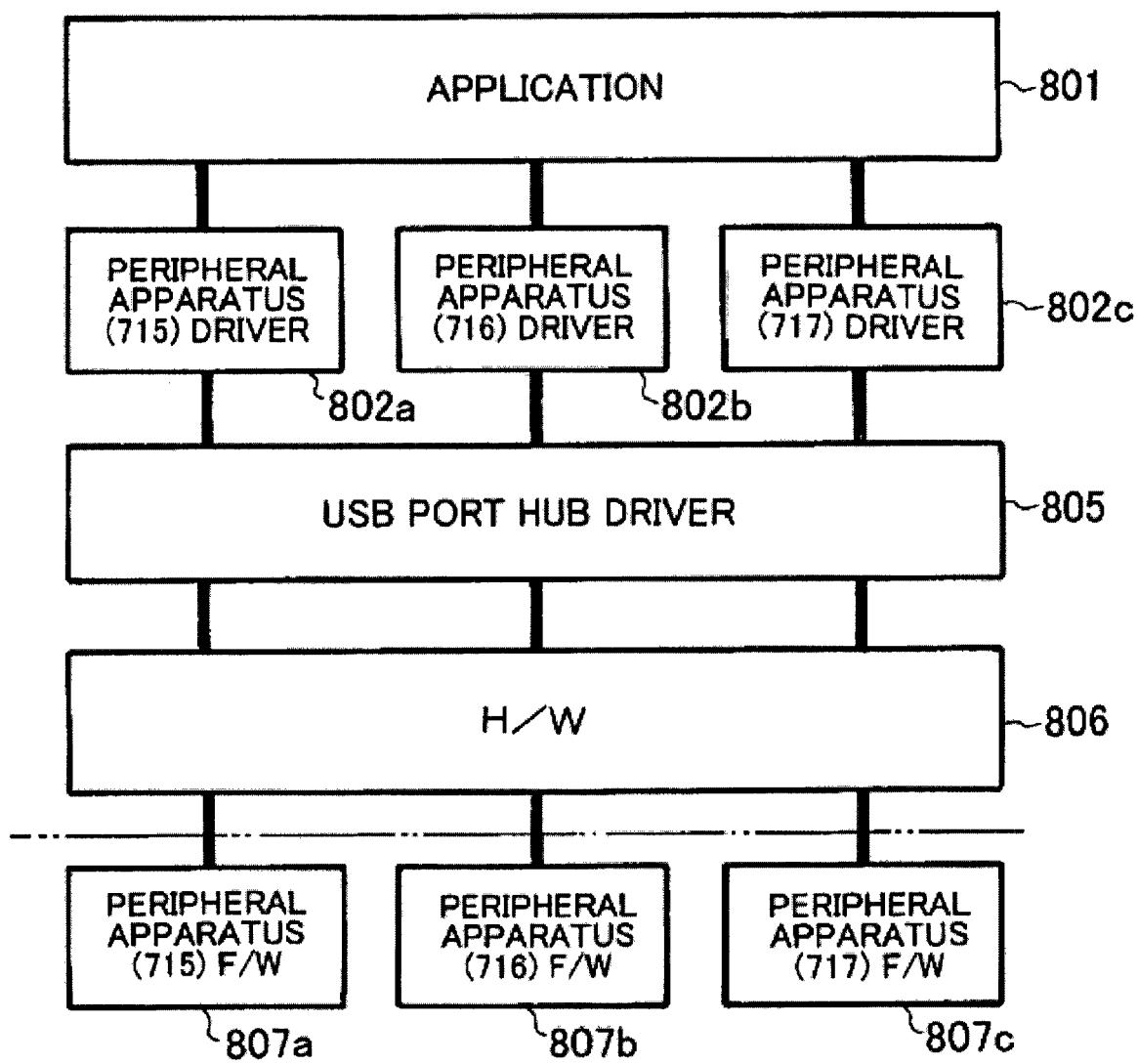

INFORMATION PROCESSING APPARATUS, INFORMATION PROCESSING SYSTEM, AND PROGRAM

BACKGROUND OF THE INVENTION

1. Field of the Invention

The present invention relates to a technique for dealing with a connection failure between an information processing apparatus such as a personal computer or a business host computer and a peripheral apparatus. More specifically, the present invention relates to a technique for using a serial bus such as a universal serial bus (USB) for connection between the information processing apparatus and the peripheral apparatus.

2. Description of the Related Art

Conventionally, there is known a USB as one of serial bus standards for connection between an information processing apparatus and a peripheral apparatus. FIG. 8 is a block diagram that depicts ordinary configurations of an information processing apparatus and peripheral apparatuses connected to the information processing apparatus by the USB. A conventional information processing apparatus 701 includes a control unit 702 which includes fundamental constituent elements of the apparatus 701 such as a central processing unit (CPU), a main storage device, and an auxiliary storage device, a USB host controller 704 connected to the control unit 702 through a system bus 703, and a USB route hub 705 that connects the controller 704 to a plurality of USB ports 709 to 711.

The information processing apparatus 701 is connected to a plurality of peripheral apparatuses 709 to 711 through cables 712 to 714 attached to the respective USB ports 709 to 711. The USB route hub 705 includes switches 706 to 708 that switch on or off the supply of a power to the corresponding peripheral apparatuses 715 to 717, respectively. The switches 706 to 708, which are connected to the respective USB ports 709 to 711, operate under control of an operating system (OS) executed by the control unit 702 through the USB host controller 704.

FIG. 9 typically shows a correlation among software used for a control over the connection between the information processing apparatus 701 and the peripheral apparatuses 715 to 717. In FIG. 9, if the peripheral apparatus 715 is connected to the USP port 709 corresponding to a hardware (H/W) 806 shown therein, for example, a general purpose OS (not shown) of the information processing apparatus 701 detects a firmware (F/W) 807a of this peripheral apparatus 715. The general purpose OS loads a peripheral apparatus driver 802a corresponding to the used USB port 709, thereby making the peripheral apparatus 715 available by an application 801.

The application 801 accesses the H/W 806, that is, the USB port 809 via the peripheral apparatus driver 802a and a USB port hub driver 805 when data is input or output to or from the connected peripheral apparatus 715. It is noted that peripheral apparatus drivers 802a to 802c and the USB port hub driver 805 are well known to those skilled in the art as a general purpose OS driver stack.

Further, the information processing apparatus 701 exercises a power control over the peripheral apparatuses 715 to 717 by causing the driver stack to control the switches 706 to 708 of the USB route hub 705. At that time, the information processing apparatus 701 is always connected to the peripheral apparatuses 715 to 717. During that time, the switches 706 to 708 are controlled according to a full-ON state, a sleep state, a suspended state or the like and a loaded state of each driver, thereby reducing power consumption.

It is assumed herein that a failure occurs to the peripheral apparatus driver 802a corresponding to the peripheral apparatus 715 and that the information processing apparatus 701 cannot use the peripheral apparatus 715. If so, the application 801 notifies the information processing apparatus 701 of this failure. The application 801 stops inputting or outputting data to or from the peripheral apparatus F/W 807 and notifies an operator of this failure. The operator disconnects the cable 712 from the USB port 709 so as to restart the peripheral apparatus driver 802.

If the cable 712 is disconnected from the USB port 709, then the general purpose OS detects absence of the peripheral apparatus F/W 807a, unloads the peripheral apparatus driver 802a, and notifies the operator of the disconnection of the peripheral apparatus 715. Thereafter, when the operator reconnects the cable 712 to the USB port 709, the general purpose OS detects connection of the peripheral apparatus F/W 807a and loads the peripheral apparatus driver 802. It is thereby possible to make the peripheral apparatus 715 available again by the application 801.

If a failure occurs to the USB connection, the relevant cable 712 is disconnected and then connected as stated above. The peripheral apparatus driver 802a can be thereby restarted. However, to save operator's labor of disconnection and connection operations, a setting may be made such that the supply of the power to the peripheral apparatus 715 is stopped by allowing the application 801 to turn off the switch 706 under control of the general purpose OS.

Generally, however, a general purpose OS is designed not to cut off the supply of the power to a peripheral apparatus in use. Due to this, even if a failure occurs to the peripheral apparatus driver 802a, the general purpose OS is incapable of automatically turning off the switch 706 as long as this driver 802a is loaded.

As a technique for dealing with the failure of the USB connection, there is known one disclosed in, for example, Japanese Patent Application Laid-Open (JP-A) No. 2001-228944. According to the technique disclosed in JP-A 2001-228944, a USB apparatus connectable to a port of a host computer through a cable has a circuit configuration of resetting connection to the host computer without disconnecting the cable. According to this conventional technique, even if a failure occurs to the connection between the USB apparatus and the host computer, the connection therebetween can be reset without the need to disconnect the cable.

However, the technique disclosed in JP-A 2001-228944 has the following disadvantages. Since this technique is for causing the USB apparatus side to emulate resetting of the connection to the host computer, it is necessary to provide the circuit configuration disclosed in JP-A 2001-228944 for every USB apparatus to be connected to the host computer. It takes lots of cost if many USB apparatuses are connected to the host computer, for example, in a business system.

Furthermore, if means for resetting the USB connection without disconnecting the cable is to be provided in the host computer, it is conventionally necessary to modify the general purpose OS itself.

SUMMARY OF THE INVENTION

The present invention has been achieved to solve the conventional disadvantages. It is an object of the present invention to provide a technique for allowing an information processing apparatus side to emulate resetting of connection between the information processing apparatus and a peripheral apparatus.

According to the present invention, there is provided an information processing apparatus comprising: a port that connects a peripheral apparatus to the information processing apparatus through a serial bus; a first switch that interrupts supply of a power to the peripheral apparatus through the port under an OS control; a second switch that interrupts the supply of the power to the peripheral apparatus when the first switch operates to supply the power thereto; and a control unit that monitors whether a failure occurs to a connection between the information processing apparatus and the peripheral apparatus through the port, and that controls an operation of the second switch based on a monitoring result independently of the OS control.

BRIEF DESCRIPTION OF THE DRAWINGS

FIG. 9 is an explanatory view of conventional USB connection-related software.

DESCRIPTION OF THE PREFERRED EMBODIMENTS

Figure 1:
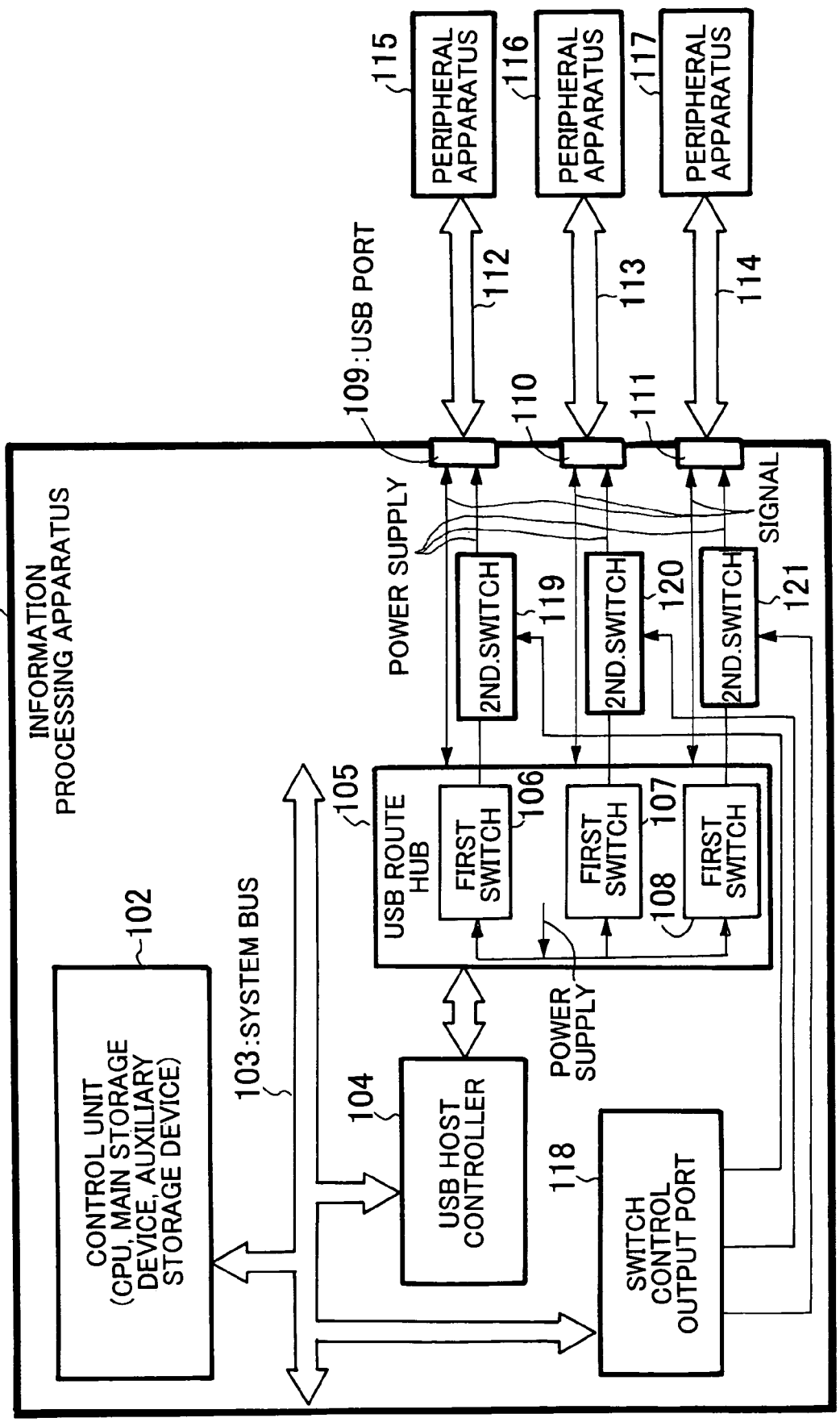
FIG. 1 is a block diagram of an information processing apparatus according to one embodiment of the present invention.

Embodiments of the present invention will be described hereinafter in detail with reference to the drawings. FIG. 1 is a block diagram of an information processing apparatus according to one embodiment of the present invention. An information processing apparatus 101 according to this embodiment includes a control unit 102 which includes fundamental constituent elements of the apparatus 101 such as a CPU, a main storage device, and an auxiliary storage device, a USB host controller 104 connected the control unit 102 through a system bus 103, and a USB route hub 105 that connects this controller 104 to a plurality of USB ports 109 to 111. In the example of FIG. 1, the USB route hub 105 includes three interfaces. However, the number of interfaces may be appropriately changed according to purposes within a range based on well-known USB specifications.

The information processing apparatus 101 is connected to a plurality of peripheral apparatuses 115 to 117 through cables 112 to 114 attached to the respective USB ports 109 to 111. The USB route hub 105 includes first switches 106 to 108 that switch on or off the supply of a power to the respective peripheral apparatuses 115 to 117 under OS control. The first switches 106 to 108 operate under the OS control exerted by the control unit 102 through the USB host controller 104.

As shown in FIG. 1, the information processing apparatus 101 according to this embodiment also includes second switches 119 to 121 for controlling the supply of the power to the respective peripheral apparatuses 115 to 117 independently of the OS control when the first switches 106 to 108 operate to switch on the supply of the power thereto, and a switch control output port 118 that transmits operation commands from the control unit 102 to the respective second switches 119 to 121.

Figure 2:
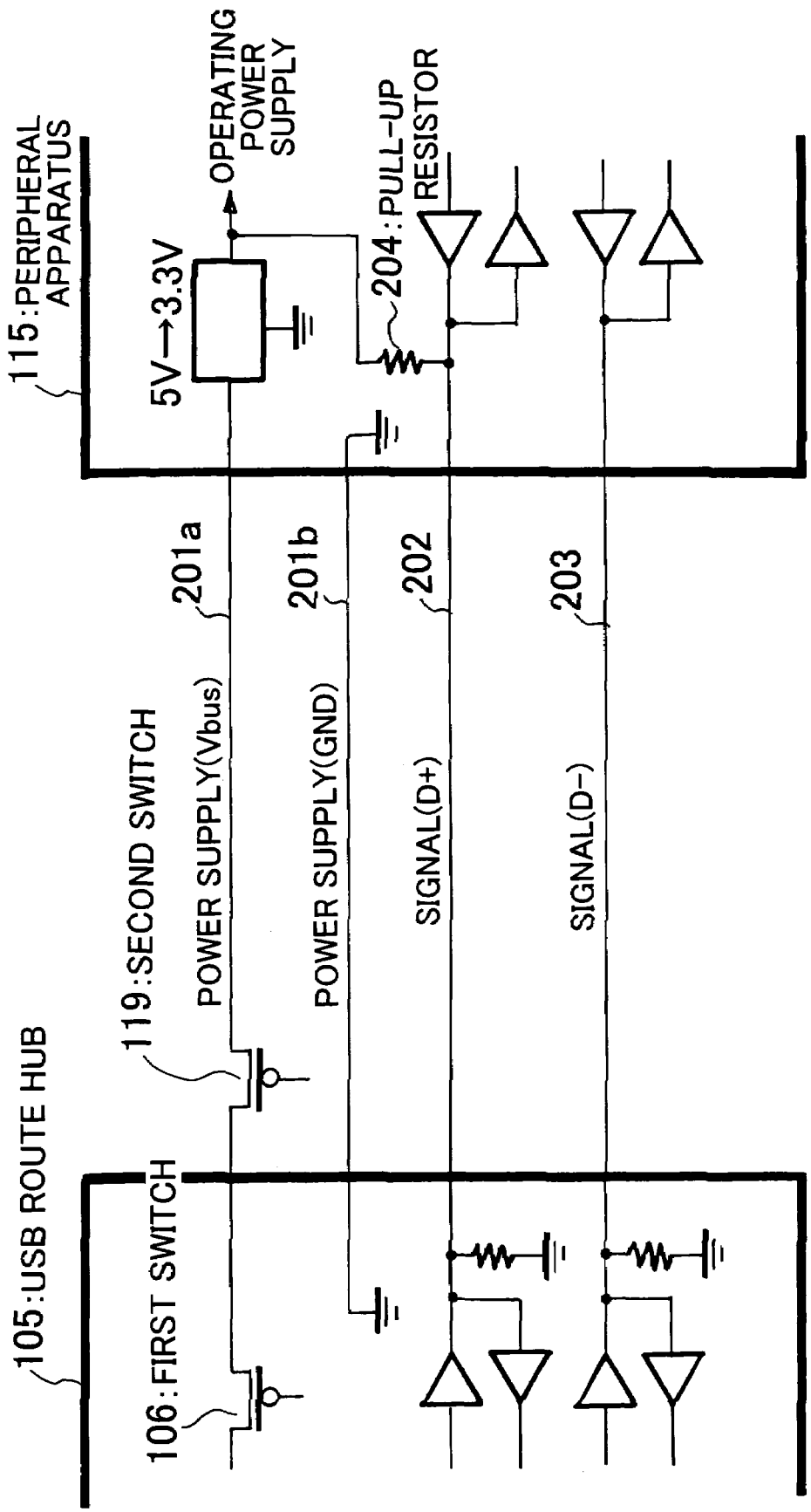
FIG. 2 is a USB connection-related circuit diagram according to this embodiment.

FIG. 2 shows a circuit configuration related to each of the first switches 106 to 108 and each of the second switches 119 to 121. In the configuration shown in FIG. 2, the first switch 106 and the second switch 119 corresponding to the peripheral apparatus 115 are shown by way of example. The second switch 119 is connected in series between the first switch 106 and the peripheral apparatus 115. Therefore, the second switch 119 is switched over from ON to OFF while the first switch 106 is turned on, whereby the supply of the power to the peripheral apparatus 115 can be stopped without disconnecting the cable 112.

Figure 3:
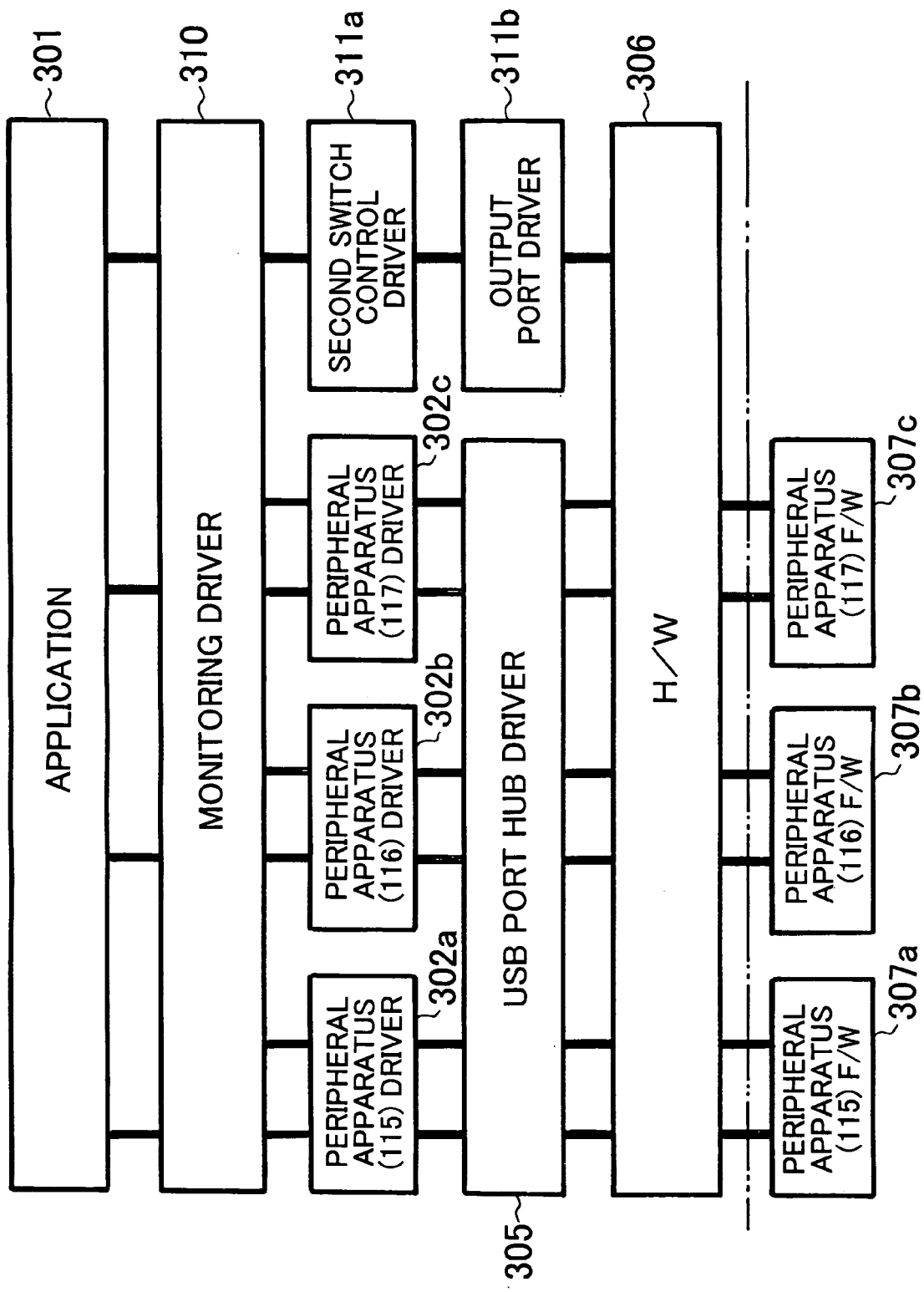
FIG. 3 is an explanatory view of USB connection-related software according to this embodiment.

FIG. 3 typically shows a correlation among software used for a control over the connection between the information processing apparatus 101 and the peripheral apparatuses 115 to 117. In this embodiment, a monitoring driver 310 for a monitoring operation, to be described later, a second switch control driver 311a for the second switches 119 to 121, and an output port driver 311b for the switch control output port 118 are provided in addition to the conventional software shown in FIG. 9. These drivers 310, 311a, and 311b are positioned to be controlled independently of peripheral apparatus drivers 302a to 302c and a USB port hub driver 305 serving as a driver stack under the OS control.

Figure 4:
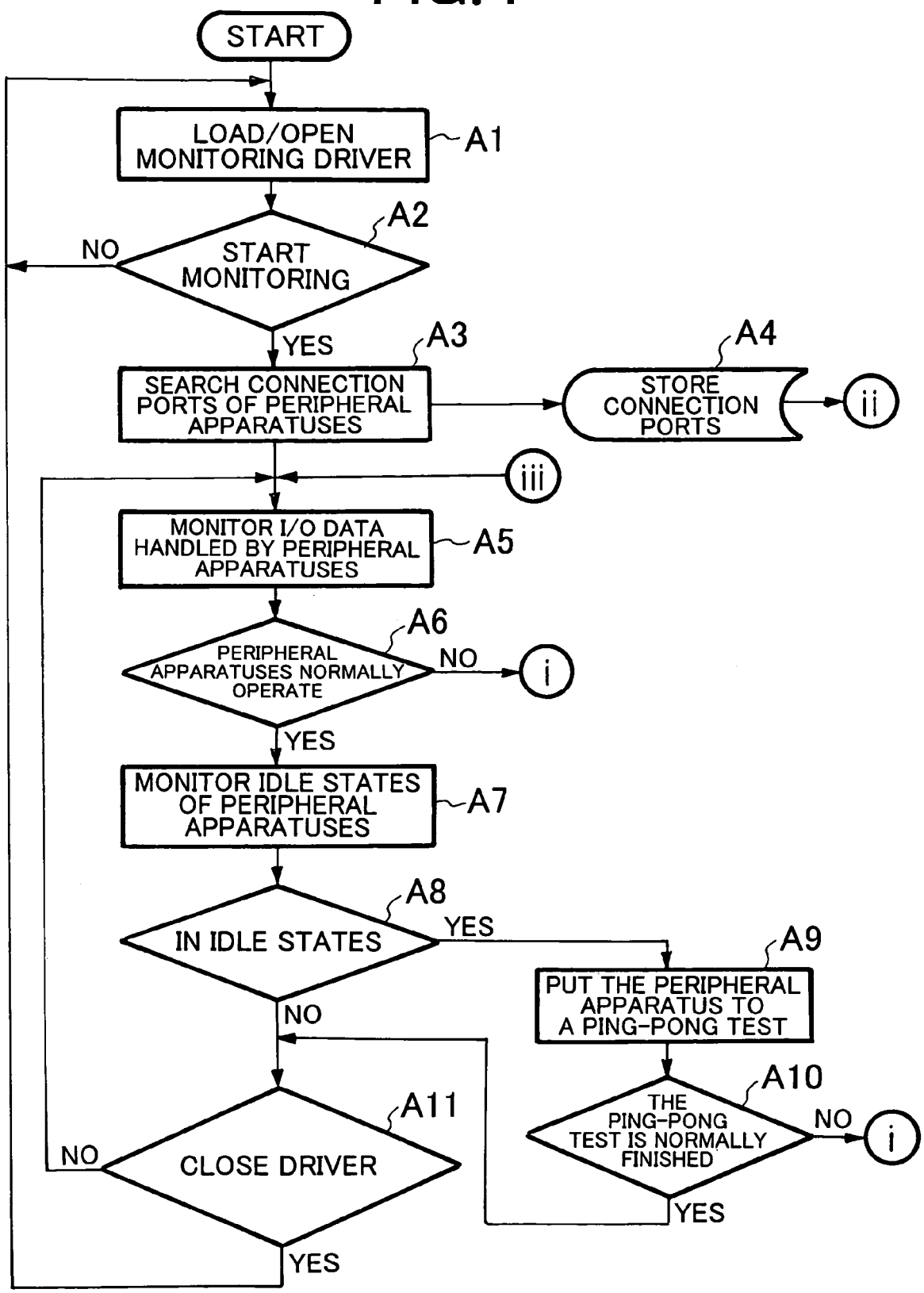
FIG. 4 is a flowchart of operation procedures according to this embodiment.
Figure 5:
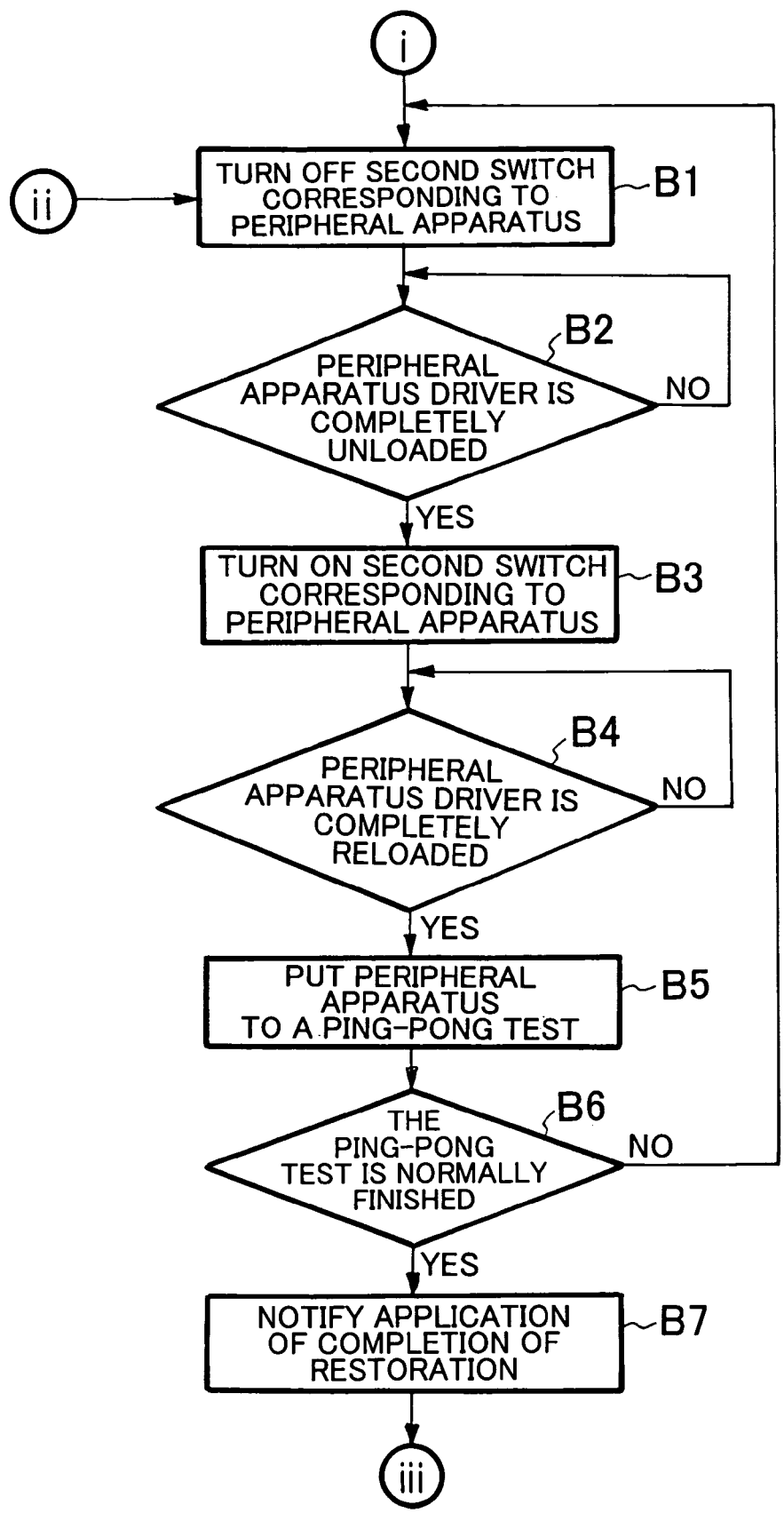
FIG. 5 is a flowchart of operation procedures according to this embodiment.

Operation procedures of the information processing apparatus 101 according to this embodiment will be described with reference to flowcharts of FIGS. 4 and 5. FIG. 4 shows basic monitoring procedures of the monitoring driver 310 with respect to the peripheral apparatuses 115 to 117. FIG. 5 shows procedures for automatically resetting the USB connection.

Referring first to FIG. 4, if the monitoring driver 310 is loaded and then opened when the information processing apparatus 101 is started (in a step A1), the monitoring driver 310 starts monitoring the peripheral apparatus drivers 302a to 302c (in a step A2). In the monitoring operation, the monitoring driver 310 searches connection states of the USB ports 109 to 121 (in a step A3) and stores a search result (in a step A4). In the case of FIG. 1, for example, the monitoring driver 310 stores the states in which the peripheral apparatus 115 is connected to the USB port 109, the peripheral apparatus 116 is connected to the USB port 110, and the peripheral apparatus 117 is connected to the USB port 111. The stored information is used for a reset processing, to be described later.

The monitoring driver 310 monitors input and output of data handled by the respective peripheral apparatus drivers 302a to 302c (in a step A5). If respective peripheral apparatus drivers 302a to 302c operate normally ("Yes" in a step A6), the monitoring apparatus 310 monitors idle states of the peripheral apparatus drivers 302a to 302c (in a step A7). While the peripheral apparatus drivers 302a to 302c are in idle states, the monitoring driver 310 subjects the peripheral apparatuses 115 to 117 to a conventionally known a ping-pong test (in a step A10) so as to confirm whether the peripheral apparatuses 115 to 117 are properly connected to the information processing apparatus 101. The monitoring driver 310 monitors the peripheral apparatus drivers 302a to 302c through these procedures until it is closed (in a step A11).

Further, if one of the peripheral apparatus drivers 302a to 302c does not normally operate to input and output data ("No" in the step A6) or if the ping-pong test is not normally finished in the idle states ("No" in a step A10), the monitoring driver 310 starts the reset processing through the procedures shown in FIG. 5 based on recognition that a failure occurs to the peripheral apparatus driver.

By way of example, an instance in which a failure occurs to the peripheral apparatus driver 302a corresponding to the peripheral apparatus 115 will be described. If detecting that a failure occurs to the peripheral apparatus driver 302a, the monitoring driver 310 recognizes that the connection port of the peripheral apparatus 115 is the USB port 109 while referring to the information stored in advance (in the step A4 of FIG. 4). The monitoring driver 310 controls the second switch 119 corresponding to this USB port 109 to be turned off through the second switch control driver 311a and the output port driver 311b (in a step B1).

Referring now to FIG. 2, if the second switch 119 is turned off, a voltage on a power supply line Vbus 201a is changed from five volts to zero volts. If so, a voltage on a signal D+ line 202 is set to zero volts through a pull-up resistor 204 so as to notify of the presence of the peripheral apparatus 115, and a voltage on a signal D− line 203 is set to zero volts. As a result, the OS of the information processing apparatus 101 detects absence of the peripheral apparatus F/W 307a of the peripheral apparatus 115, and the corresponding peripheral apparatus driver 302a is unloaded.

If recognizing that the peripheral apparatus driver 302a is completely unloaded ("Yes" in a step B2), the monitoring driver 310 turns on the second switch 119 through the second switch control driver 311a and the output port driver 311b (in a step B3). If the second switch 119 is turned on, the voltage on the power supply line Vbus 201a is returned to five volts. The voltages on the signal D+ line 202 and the signal D− line 203 are set to voltages that indicate the presence of the peripheral apparatus 115. The OS of the information processing apparatus 101 detects the presence of the peripheral apparatus F/W 307a, whereby the peripheral apparatus driver 302a is reloaded.

If recognizing that the peripheral apparatus driver 302a is completely reloaded ("Yes" in a step B4), the monitoring driver 310 subjects the peripheral apparatus 115 to a ping-pong test (in a step B5). If the test is normally finished ("Yes" in a step B6), the monitoring driver 310 notifies the application 301 of restoration from the failure (in a step B7) and performs the monitoring operation described with reference to FIG. 4. If the ping-pong test is not normally finished ("No" in the step B6), the monitoring driver 310 repeatedly performs the reset processing until the ping-pong test is normally finished.

According to this embodiment stated above, by providing the information processing apparatus 101 with the second switches 119 to 121 that control the supply of the power to the peripheral apparatuses 115 to 117 using the first switches 106 to 108, the information processing apparatus 101 can emulate resetting of the USB connection. In addition, since the second switches 119 to 121 are controlled independently of the OS of the information processing apparatus 101, it is possible to automatically reset the USB connection without the need to modify the OS.

Figure 6:
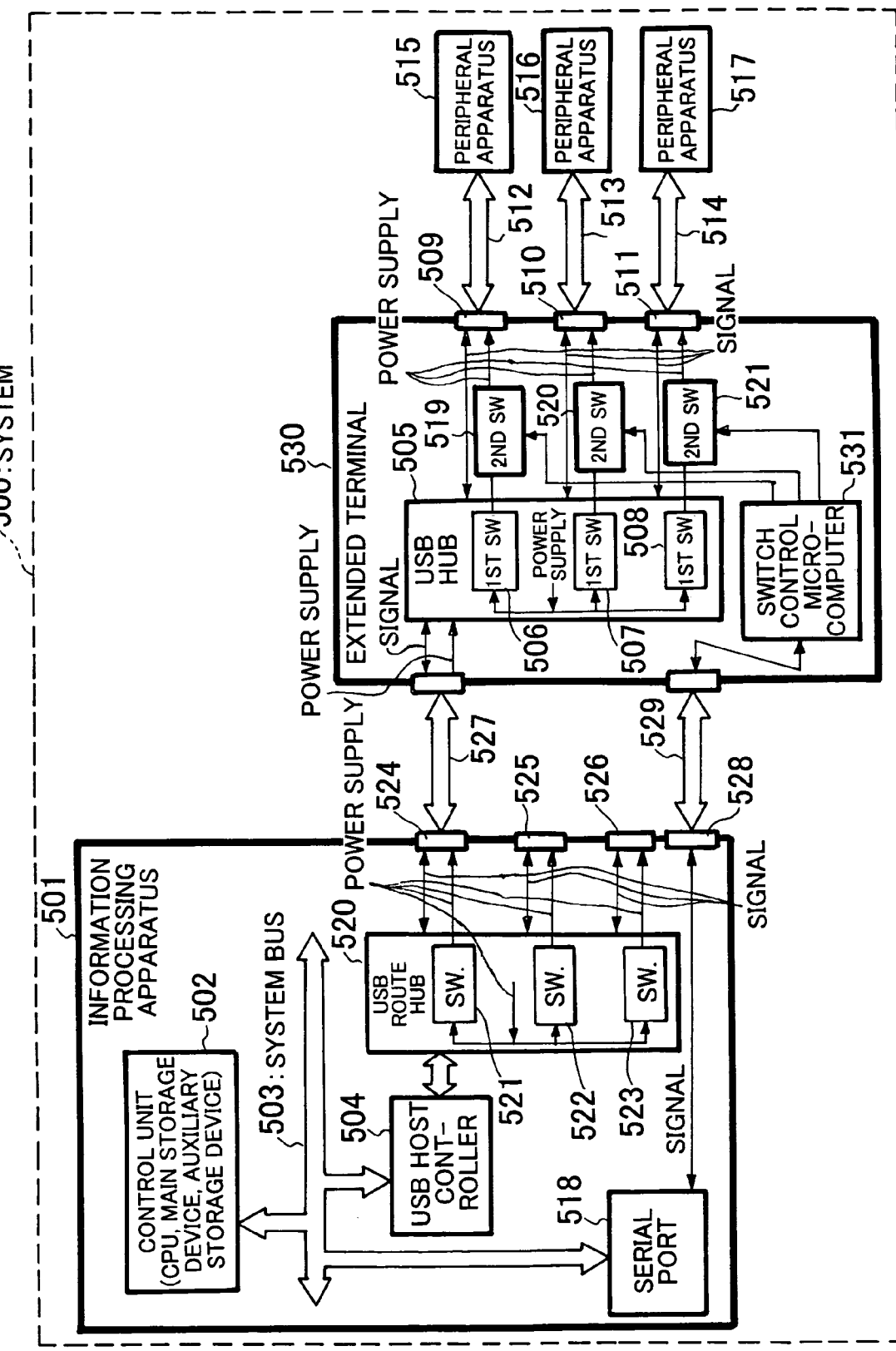
FIG. 6 is a block diagram of an information processing system according to another embodiment of the present invention.

FIG. 6 is a block diagram of an information processing system according to another embodiment of the present invention. An information processing system 500 according to this embodiment is configured as follows. A plurality of peripheral apparatuses 515 to 517 are connected to an information processing apparatus 501 through an extended terminal 530. The information processing apparatus 501 includes ordinary constituent elements for the USB connection such as a USB host controller 504, a USB route hub 520, and USB ports 524 to 526. The extended terminal 530 includes first switches 506 to 508 and second switches 519 to 521 similarly to those described in the preceding embodiment.

As shown in FIG. 6, a USB hub 505 of the extended terminal 530 is connected to the USB hub 520 of the information processing apparatus 501 through one of the USB ports 524 to 526 (the USB port 524 in the example of FIG. 6).

Further, the second switches 519 to 521 of the extended terminal 530 are connected to a serial port 518 of the information processing apparatus 501 through a switch control microcomputer 531. Namely, the second switches 519 to 521 are controlled by a control unit 502 of the information processing apparatus 501 through the serial port 518 and the switch control microcomputer 531. Alternatively, the extended terminal 530 may be connected to the information processing apparatus 501 through a parallel port (not shown) of the information processing apparatus 501 in place of the serial port 518.

Figure 7:
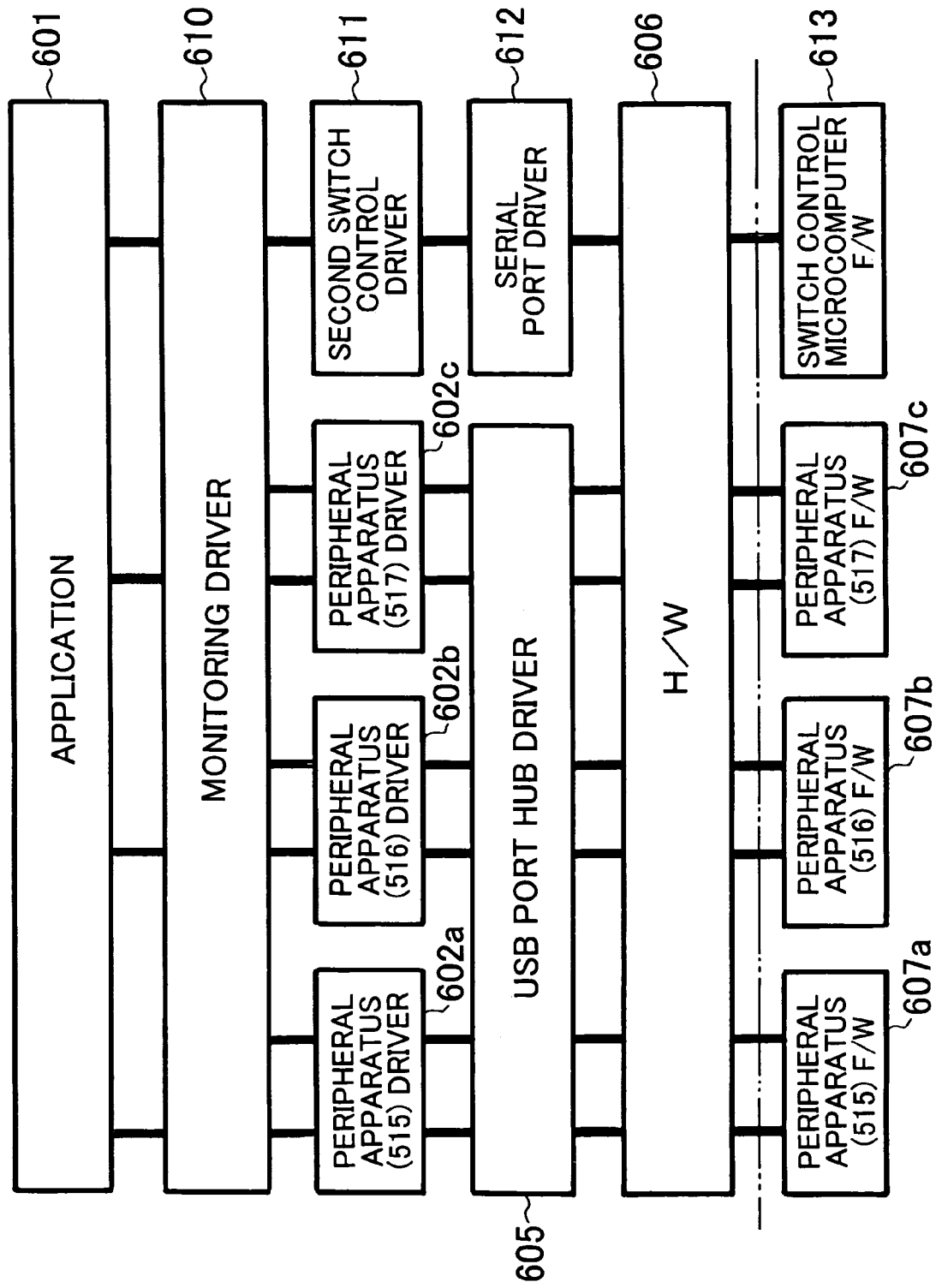
FIG. 7 is an explanatory view of USB connection-related software according to this another embodiment.
Figure 8:
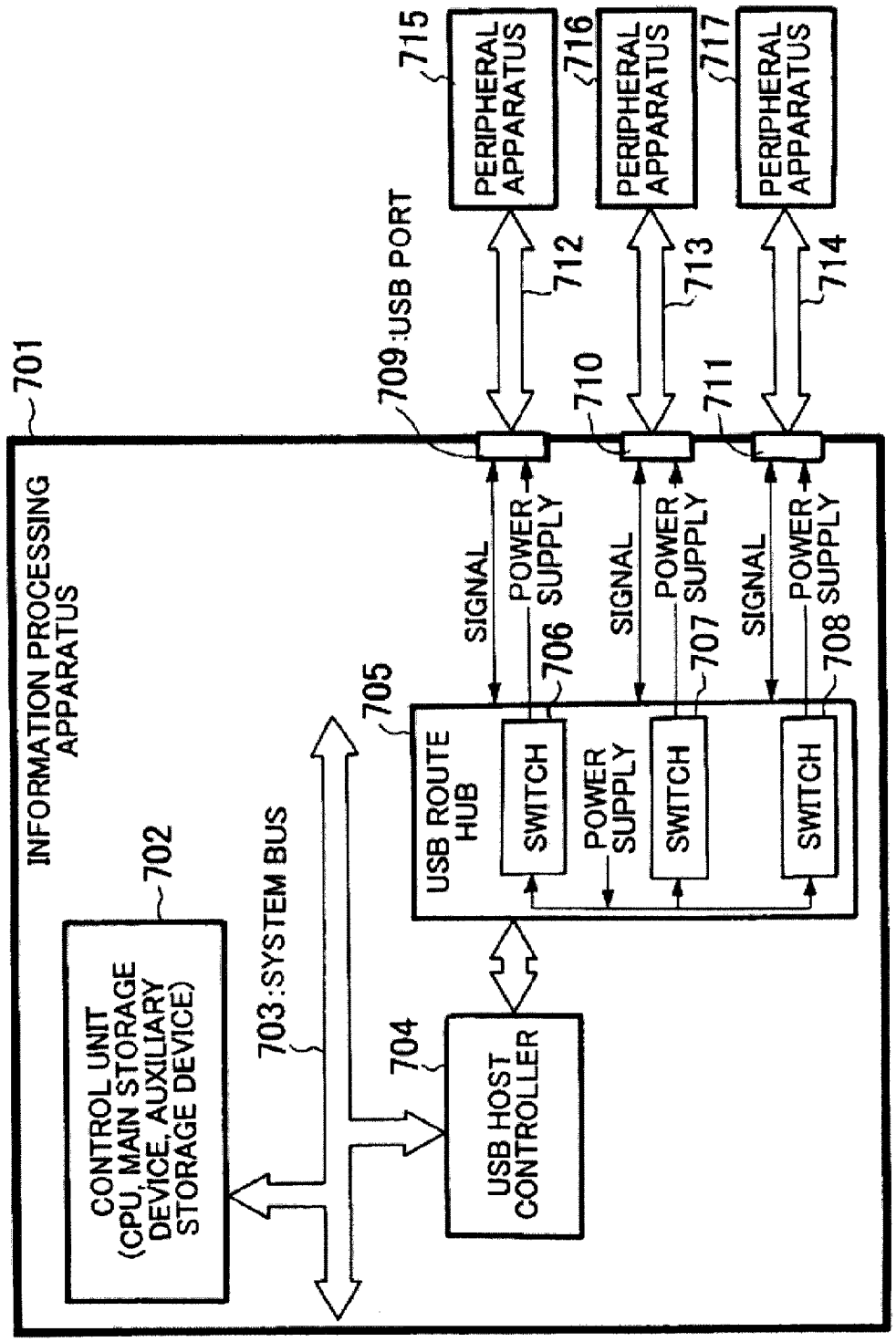
FIG. 8 is a block diagram of a conventional information processing apparatus.

FIG. 7 is an explanatory view of a correlation among software according to this embodiment. A software configuration according to this embodiment differs from that according to the preceding embodiment in that a serial port driver 612 is provided in place of the output port driver 311b shown in FIG. 3 and in that a switch control microcomputer F/W 613 of the switch control microcomputer 531 is recognized. The other configuration is the same as FIG. 3 according to the preceding embodiment. In addition, since operation procedures according to this embodiment are the same as those described with reference to FIGS. 4 and 5, they will not be repeatedly described herein.

This embodiment can exhibit the same advantages as those of the embodiment shown in FIG. 1 described above. In addition, this embodiment exhibit an advantage in that the present invention can be carried out by a computer other than the computer that includes the switch control output port 118 in advance (FIG. 1) for controlling the second switches.

The present invention is suitable for purposes required to promptly deal with restoration from the failure of the USB connection. For example, the present invention is suitable for automatic restoration from a connection failure between a server apparatus and peripheral apparatuses such as a keyboard, a receipt printer, a bankbook printer, and a card reader in a POS system for sales management or a financial institution system.

According to the present invention, by providing the information processing apparatus with the second switches that control the supply of the power to the peripheral apparatuses using the first switches, the information processing apparatus can emulate resetting of the connection to the peripheral apparatuses. In addition, since the information processing apparatus controls the second switches independently of the OS, it is possible to perform the automatic reset processing that can dispense with disconnection of the cable without the need to modify the OS.

Although the exemplary embodiments of the present invention have been described in detail, it should be understood that various changes, substitutions and alternatives can be made therein without departing from the sprit and scope of the invention as defined by the appended claims. Further, it is the inventor's intent to retrain all equivalents of the claimed invention even if the claims are amended during prosecution.

What is claimed is:
1. An information processing apparatus comprising:
a port that connects a peripheral apparatus to the information processing apparatus through a serial bus;
a first switch that interrupts supply of a power to the peripheral apparatus through the port under an OS control;

a second switch that interrupts the supply of the power to the peripheral apparatus while the connection between the peripheral apparatus and the port remains fully engaged when the first switch operates to supply the power thereto; and a control unit that monitors whether a communication failure occurs between the information processing apparatus and the peripheral apparatus connected through the port, and that controls an operation of the second switch based on a monitoring result independently of the OS control, wherein the control unit controls the second switch to resume the supply of the power to the peripheral apparatus when recognizing a driver for the peripheral apparatus is unloaded.

2. The information processing apparatus according to claim 1, wherein the port connects the peripheral apparatus to the information processing apparatus through a USB.

3. The information processing apparatus according to claim 1, wherein the control unit controls the second switch so as to reset the connection between the information processing apparatus and the peripheral apparatus when detecting the communication failure.

4. The information processing apparatus according to claim 1, wherein the control unit controls the operation of the second switch corresponding to each of a plurality of peripheral apparatuses for the each peripheral apparatus.

5. The information processing apparatus according to claim 1, wherein the second switch is connected in series between the port and the first switch.

6. An information processing system comprising:
a peripheral apparatus;
a terminal apparatus including:
    a port that connects the peripheral apparatus to the terminal apparatus through a serial bus;
    a first switch that interrupts supply of a power to the peripheral apparatus through the port under an OS control; and
    a second switch that interrupts the supply of the power to the peripheral apparatus while the connection between the peripheral apparatus and the port remains fully engaged when the first switch operates to supply the power thereto; and
an information processing apparatus including:
    a port that connects the terminal apparatus to the information processing apparatus; and
    a control unit that monitors whether a communication failure occurs between the terminal apparatus and the peripheral apparatus, and that controls an operation of the second switch based on a monitoring result independently of the OS control, wherein the control unit controls the second switch to resume the supply of the power to the peripheral apparatus when recognizing a driver for the peripheral apparatus is unloaded.

7. The information processing system according to claim 6, wherein the port of the terminal apparatus connects the peripheral apparatus to the information processing apparatus through a USB.

8. The information processing system according to claim 6, wherein the control unit controls the second switch so as to reset the connection between the terminal apparatus and the peripheral apparatus when detecting the communication failure.

9. The information processing system according to claim 6, wherein the terminal apparatus is connected to a plurality of the peripheral apparatuses, and
    the control unit controls the operation of the second switch corresponding to each of the plurality of peripheral apparatuses for the each peripheral apparatus.

10. The information processing system according to claim 6, wherein the second switch is connected in series between the port of the terminal apparatus and the first switch.

11. A computer readable medium having stored therein a program that causes a computer to execute steps of:
    monitoring whether a communication failure occurs between the computer and a peripheral apparatus;
    controlling an operation of a second switch based on a monitoring result independently of an OS control; and
    controlling the second switch to resume the supply of the power to the peripheral apparatus when recognizing a driver for the peripheral apparatus is unloaded,
wherein the computer includes:
    a port that connects the peripheral apparatus to the computer through a serial bus;
    a first switch that interrupts supply of a power to the peripheral apparatus through the port under the OS control; and
    a second switch that interrupts the supply of the power to the peripheral apparatus while the connection between the peripheral apparatus and the port remains fully engaged while the first switch operates to supply the power thereto.

12. The computer readable medium having stored therein the program according to claim 11, wherein the port connects the peripheral apparatus to the computer through a USB.

* * * * *

UNITED STATES PATENT AND TRADEMARK OFFICE
CERTIFICATE OF CORRECTION

PATENT NO. : 7,539,808 B2  Page 1 of 1
APPLICATION NO. : 11/411052
DATED : May 26, 2009
INVENTOR(S) : Hiroshi Kojima It is certified that error appears in the above-identified patent and that said Letters Patent is hereby corrected as shown below:

Column 1, line 32, delete "709 to 711", insert -- 715 to 717 --

Column 1, line 53, delete "809", insert -- 709 --

Signed and Sealed this

First Day of December, 2009

David J. Kappos
*Director of the United States Patent and Trademark Office*